Feb. 26, 1957 — E. FRITSCH — 2,783,293
STORAGE BATTERY MOUNTINGS
Filed Dec. 22, 1955
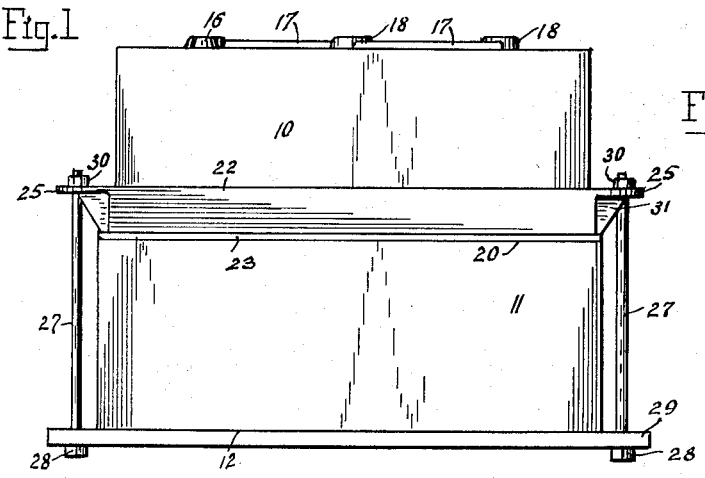
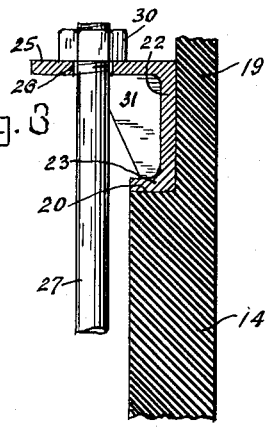
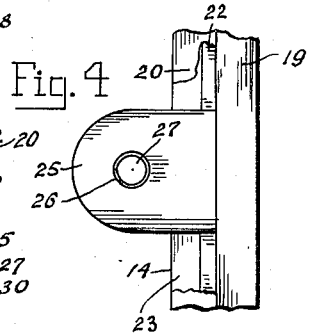
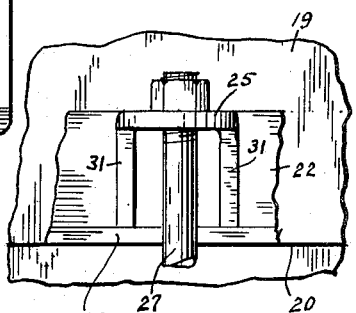
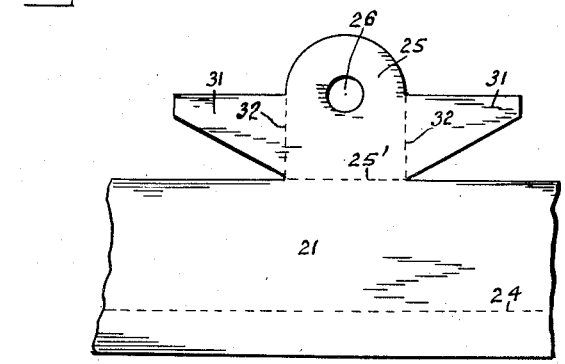
INVENTOR:
Erich Fritsch
BY Sigmund Herzog
attorney

United States Patent Office 2,783,293
Patented Feb. 26, 1957

2,783,293

STORAGE BATTERY MOUNTINGS

Erich Fritsch, Clinton, Mass., assignor to Van Brode Milling Co., Inc., Clinton, Mass., a corporation of Massachusetts Application December 22, 1955, Serial No. 554,886

2 Claims. (Cl. 136—166)

The present invention relates to the mounting of electric storage batteries in automotive vehicles, and more particularly to the arrangement of the conventional hold-down frame upon the battery.

The batteries of automotive vehicles, such as automobiles or motor boats, are mounted on supports, to which they are conveniently held by some kind of a frame or hold-down, which is applied to the top of the battery and connected to the support by bolts. Since these frames are usually formed of metal, generally iron or steel, and are so located as to be particularly subject to corrosion, they require frequent replacement. Moreover, being disposed in proximity of the terminal wires of the battery, they are apt to short-circuit the battery, and more so the present day batteries the voltage of which has been raised recently.

The main object of the present invention is to so construct the battery casings and hold-down frames that the latter may be disposed at a substantial distance below the battery top, thereby being practically out of the zone of action of the electrolyte which may be spilled from the battery, and at a position where it cannot cause a short-circuit between the terminals of the battery.

Another object of the invention is to provide a battery casing and hold-down device of the character mentioned which are simple in construction, efficient in operation and which are capable of manufacture on a commercial scale, or, in other words, which are not so difficult to be produced as to be beyond the reasonable cost of such appliances.

With these and other objects in view, which will more fully appear as the nature of the invention is better understood, the same consists in the combination, arrangement and construction of the parts hereinafter described, pointed out in the appended claims and illustrated in the accompanying drawings, it being understood that many changes may be made in the size and proportion of the several elements and details of construction within the scope of the appended claims without departing from the spirit or sacrificing any of the advantages of the invention.

One of the many possible embodiments of the invention is illustrated in the accompanying drawings, in which:

Figure 1 is a front elevation of the improved battery casing with a hold-down frame in position thereon;

Figure 2 is a top plan view of the same;

Figure 3 is a vertical section, on a larger scale, taken through one of the battery casing walls and the hold-down frame mounted thereon;

Figure 4 is a top plan view of the enlarged structure illustrated in Figure 3, the clamping-bolt nut being removed therefrom;

Figure 5 is a side elevation of the construction depicted in Figure 4; and

Figure 6 is a plan view of a portion of a blank of which the hold-down frame illustrated in the drawings is formed.

Referring now to the drawings, the numeral 10 indicates a storage battery, including a casing 11 of generally rectangular form, having a bottom 12, side walls 13, end walls 14 and a cover 15. This cover is composed of a plurality of sections, the number of which corresponds to that of the number of cells of the battery. The numerals 16 denote the battery terminals, the numerals 17 the connectors between the terminals of adjacent cells, and the numerals 18 the filler plugs. As usual in appliances of this type, the casing and cover are molded of a suitable acid resistant rubber-like material. The construction and operation of the elements thus far described are well known and, therefore, a more detailed description thereof is deemed to be unnecessary.

Both the side walls 13 and the end walls 14 of the battery casing are reduced in thickness a substantial distance down from the top of the casing, the reduced portions of the casing walls being denoted by the numerals 19. A ledge 20 is thus formed all around the outer face of the battery casing, said ledge projecting outwardly from the reduced portions of the casing walls and presenting a surface to be engaged by the hold-down frame. Preferably, the ledge is disposed in a horizontal plane, which may be located at any suitable distance from the battery top, sufficient to prevent corrosive action of the electrolyte on the metallic hold-down frame and to stop interference of the latter with the battery terminal wires.

The cost of the battery casing herein described is substantially the same as that of any conventional casing, since the upper sections of the casing walls are thinner than those of any conventional casing, this being permissible in view of the fact that these thinner wall sections are not subjected to the thrust of the clamping bolts, as will hereinafter appear. The material gained by reducing the thickness of the upper portions of the casing walls is used to thicken the lower portions of said walls so that a ledge of substantial width is obtained. Therefore, the cost of the battery, as a whole, stands below that of the conventional battery, it being obvious that the clamping bolts of the improved battery are substantially shorter and, thus, less expensive than those of the batteries heretofore in use.

As appears from above, the ledge 20 serves as a surface against which the hold-down frame may bear to exert a downward thrust by the application of the usual clamping bolts and nuts. Obviously, any suitable type of a hold-down frame may be employed in conjunction with the battery casing herein described. However, a preferred form of a frame is illustrated in the accompanying drawings. It comprises a structure of generally rectangular form in order to be complementary to the size and shape of the battery casing hereinabove described and illustrated in the accompanying drawings. Preferably, this frame is formed of a metal strip 21 (Fig. 6) of suitable thickness to give proper strength to the structure, it including a vertical flange 22 and a horizontal flange 23, the latter extending outwardly from said vertical flange (Fig. 3). After the strip has been bent along the dotted line 24 (Fig. 6) to form the said flanges, and the strip, as a whole, has been formed into rectangular shape to fit the battery casing walls, the meeting ends of the strip are united, for instance, by welding. The vertical flange portions of the strip abut against the outer faces of the reduced portions of the casing walls and the horizontal flange portions thereof rest on the ledge 20. The strip 21 is provided with two lugs 25, which are bent along the dotted lines 25' (Fig. 6) at right angles to the vertical flange 22. Each lug is provided with a perforation 26, for the reception of a bolt 27, the lower headed end 28 of which is fixed to the battery support 29, on which the battery rests. The upper end of each bolt extends above its lug 25 and is engaged by a nut 30, by means of which the hold-down frame is held down against the ledge 20. To brace the lugs 25, each is provided with two struts 31, bent along the dotted lines 32 (Fig. 6) at right angles to its lug into contact with the horizontal flange of the hold-down frame.

The elements of the improved hold-down frame form an integral structure, although, obviously, the several elements thereof or some of the same may be separately shaped and united with the other elements.

The operation of the structure herein disclosed is substantially as follows:

The battery is mounted by being placed upon the support 29. The hold-down frame is then applied to the battery with its horizontal flange resting on the ledge 20. If the bolts 27 have already been fixed to the support and the nuts 30 disengaged therefrom, the upper ends of said bolts will pass through the perforations 26 in the lugs 25 as the hold-down frame is being shifted onto said ledge. The nuts are then threaded tightly on their bolts, whereby the battery is fixed to the support against vertical and horizontal movements.

What I claim is:

1. The combination with a storage battery casing made of one integral piece and including side walls and end walls, of a ledge formed a substantial distance from the top of said casing on the outer faces of said walls by reducing the thickness of the upper portions of said walls, a hold-down frame resting on said ledge and including a vertical flange fitting the outer faces of the reduced portions of said walls and a horizontal flange bearing against said ledge, and apertured lugs on said vertical flange for the reception of clamping bolts.

2. A device according to claim 1, including struts on said lugs bearing against said horizontal flange.

References Cited in the file of this patent

UNITED STATES PATENTS 2,451,532  Brown _____ Oct. 19, 1948

FOREIGN PATENTS 572,892  Great Britain _____ Oct. 29, 1945
588,688  Great Britain _____ May 30, 1947